United States Patent
Zhu et al.

(10) Patent No.: US 10,796,148 B2
(45) Date of Patent: Oct. 6, 2020

(54) AIRCRAFT LANDING PROTECTION METHOD AND APPARATUS, AND AIRCRAFT

(71) Applicant: AUTEL ROBOTICS CO., LTD., Shenzhen, Guangdong (CN)

(72) Inventors: Ying Zhu, Guangdong (CN); Yu Song, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 106 days.

(21) Appl. No.: 15/894,126

(22) Filed: Feb. 12, 2018

(65) Prior Publication Data

US 2019/0197291 A1    Jun. 27, 2019

Related U.S. Application Data

(63) Continuation of application No. PCT/CN2017/118662, filed on Dec. 26, 2017.

(51) Int. Cl.
*G06K 9/00* (2006.01)
*G08G 5/02* (2006.01)
(Continued)

(52) U.S. Cl.
CPC .......... *G06K 9/0063* (2013.01); *B64C 39/024* (2013.01); *G05D 1/0055* (2013.01);
(Continued)

(58) Field of Classification Search
None
See application file for complete search history.

(56) References Cited

U.S. PATENT DOCUMENTS 8,723,953 B2 * 5/2014 Klomp ............... H04N 7/18
                                              348/144
8,744,126 B1 * 6/2014 Rohrschneider ...... G06K 9/44
                                              382/100
(Continued)

FOREIGN PATENT DOCUMENTS

CN    102929284 A    2/2013
CN    104058095 A    9/2014
(Continued)

OTHER PUBLICATIONS

John Dougherty, et al. "Laser-based Guidance of a Quadrotor UAV for Precise Landing on an Inclined Surface", 2015 American Control Conference (ACC), IEEE, Jun. 4, 2014, pp. 1210-1215, XP032621624, *the whole document*.
(Continued)

*Primary Examiner* — Thomas G Black
*Assistant Examiner* — Demetra R Smith-Stewart

(57) ABSTRACT

The present invention discloses a landing protection method and apparatus and an aircraft. The method includes: obtaining an image of a landing area; determining a feature point in the image; determining, according to the feature point, whether the landing area is a dangerous landing area; and if yes, controlling the aircraft to suspend landing or controlling the aircraft to fly away from the dangerous landing area. By means of the present invention, whether a landing area is a dangerous landing area may be determined according to an obtained image, so that the landing safety of the aircraft is ensured.

13 Claims, 5 Drawing Sheets

Determine whether a quantity of feature point in the image is less than or equal to a first preset threshold — S30

Yes

Determine that the landing area is the dangerous landing area — S31

(51) Int. Cl.
    *G05D 1/02*     (2020.01)
    *B64C 39/02*     (2006.01)
    *G05D 1/00*     (2006.01)
    *G06K 9/62*     (2006.01)
    *G08G 5/00*     (2006.01)
    *G06K 9/46*     (2006.01)

(52) U.S. Cl.
    CPC ......... *G05D 1/0202* (2013.01); *G06K 9/4604* (2013.01); *G06K 9/6202* (2013.01); *G08G 5/0021* (2013.01); *G08G 5/0069* (2013.01); *G08G 5/0086* (2013.01); *G08G 5/02* (2013.01); *G08G 5/025* (2013.01); *B64C 2201/127* (2013.01)

(56) References Cited

U.S. PATENT DOCUMENTS

| | | | | |
|---|---|---|---|---|
| 2013/0329052 | A1* | 12/2013 | Chew | H04N 7/181 |
| | | | | 348/159 |
| 2016/0086497 | A1* | 3/2016 | Williams | G06K 9/0063 |
| | | | | 701/16 |
| 2016/0093225 | A1* | 3/2016 | Williams | G01S 5/16 |
| | | | | 701/17 |
| 2018/0074519 | A1* | 3/2018 | Qin | B64C 39/024 |
| 2018/0101173 | A1* | 4/2018 | Banerjee | G06T 7/70 |
| 2019/0087635 | A1* | 3/2019 | Klaus | G06K 9/0063 |

FOREIGN PATENT DOCUMENTS

| | | |
|---|---|---|
| CN | 105259917 A | 1/2016 |
| CN | 105518559 A | 4/2016 |
| CN | 105787192 A | 7/2016 |
| CN | 106494632 A | 3/2017 |
| CN | 107310716 A | 11/2017 |
| JP | 2017-068298 A | 4/2017 |
| WO | 2017/034595 A1 | 3/2017 |

OTHER PUBLICATIONS

Andres Huertas, et al. "Passive Imaging Based Multi-cue Hazard Detection for Spacecraft Safe Landing", 2006 IEEE Aerospace Conference; Big Sky, Montana; Mar. 4-11, 2006, IEEE Operations Center, Piscataway, NJ, pp. 1-14, XP010928460 *sec, 3(B)*.

Timothy Patterson, et al; "Timely autonomous identification of UAV safe landing zones", Image and Vision Computing vol. 32, Issue 9, Sep. 2014; pp. 568-578, XP029012259, *abstract* *figure 1*.

Sebastian Scherer, et al; "Autonomous landing at unprepared sites by a full-scale helicopter", Robotics and Autonomous Systems, vol. 60, No. 12, Dec. 1, 2012, pp. 1545-1562, XP055322943, *the whole document*.

International Search Report dated Sep. 19, 2018; PCT/CN2017/118662.

Supplementary European Search Report completed Jun. 27, 2019; Appln. No. EP17 84 2281.

* cited by examiner

AIRCRAFT LANDING PROTECTION METHOD AND APPARATUS, AND AIRCRAFT

CROSS REFERENCE

This application is a continuation of International Application No. PCT/CN2017/118662, filed on Dec. 26, 2017, the disclosure of which is hereby incorporated by reference in its entirety.

TECHNICAL FIELD

The present invention relates to an aircraft, and in particular, to an aircraft landing protection method and apparatus and an aircraft using the method or apparatus.

RELATED ART

It is very important for an aircraft to make safe landing. When the aircraft fails to land safely, the aircraft may suffer from somewhat damage, ranging from overhauling to even crash.

In related arts, the aircraft may automatically return to a take-off point according to a setting. However, in many cases, for example, when the battery power is low or when the aircraft arrives at a predetermined position, the aircraft needs to automatically land at a different location.

However, when it is impossible to know whether a current landing area is suitable for the safe landing of the aircraft, the landing safety of the aircraft cannot be ensured.

SUMMARY

The following is only the brief description of the subject that is described in detail in the present invention. The brief description is not intended to limit the protection scope of the claims.

Embodiments of the present invention provide an aircraft landing protection method, including:

obtaining an image of a landing area;

determining a feature point in the image;

determining, according to the feature point, whether the landing area is a dangerous landing area; and if yes, controlling the aircraft to suspend landing or controlling the aircraft to fly away from the dangerous landing area.

In an embodiment of the present invention, the determining, according to the feature point, whether the landing area is the dangerous landing area includes:

determining whether a quantity of the feature point in the image is less than or equal to a first preset threshold; and if yes, determining that the landing area is the dangerous landing area.

In an embodiment of the present invention, the first preset threshold is 3.

In an embodiment of the present invention, the determining, according to the feature point, whether the landing area is the dangerous landing area includes:

determining a normal vector (nx, ny, nz) of a plane that is fit to all the feature points in the image;

determining whether nz in the normal vector (nx, ny, nz) is less than a second preset threshold; and if yes, determining that the landing area is the dangerous landing area.

In an embodiment of the present invention, the determining the normal vector (nx, ny, nz) of the plane that is fit to all the feature points in the image includes:

determining a world coordinate of each feature point in the image relative to a photographing apparatus of the aircraft; and calculating, by using the following formula, the normal vector (nx, ny, nz) of the plane that is fit to all the feature points in the image:

$$\begin{pmatrix} nx \\ ny \\ nz \end{pmatrix} = \begin{pmatrix} \sum Xi^2 & \sum XiYi & \sum Xi \\ \sum XiYi & \sum Yi^2 & \sum Yi \\ \sum Xi & \sum Yi & N \end{pmatrix}^{-1} * \begin{pmatrix} \sum XiZi \\ \sum YiZi \\ \sum Zi \end{pmatrix}$$

where Xi, Yi, Zi is the world coordinate of an $i^{th}$ feature point relative to the photographing apparatus of the aircraft, i=1, ..., N, and N is the quantity of the feature point in the image.

In an embodiment of the present invention, the photographing apparatus is a depth camera capable of directly obtaining Zi, and the determining the world coordinate of each feature point in the image relative to the photographing apparatus of the aircraft includes:

obtaining Zi in the world coordinate of each feature point by using the depth camera; and obtaining a pixel coordinate xp, yp of each feature point, and calculating Xi, Yi by using the following formula:

$$Xi = \frac{Zi(xp - cx)}{fx}$$

$$Yi = \frac{Zi(yp - cy)}{fy}$$

where cx, cy is a coordinate of an optical center of the depth camera, and fx, fy are focal lengths of the depth camera on an X axis and a Y axis.

In an embodiment of the present invention, the photographing apparatus is a depth camera incapable of directly obtaining Zi, and the determining the world coordinate of each feature point in the image relative to the photographing apparatus of the aircraft includes:

obtaining pixel coordinates xr, yr and xl, yl of a same feature point in two adjacent images; and calculating Zi, Xi and Yi by using the following formula:

$$Zi = \frac{fx \times b}{(xl - xr)}$$

$$Xi = \frac{Zi(xl - cx)}{fx}$$

$$Yi = \frac{Zi(yl - cy)}{fy}$$

where cx, cy is a coordinate of an optical center of the depth camera, fx, A are focal lengths of the depth camera on an X axis and a Y axis, and b is a baseline distance of the depth camera.

In an embodiment of the present invention, the determining, according to the feature point, whether the landing area is the dangerous landing area includes:

determining a plane that is fit to all the feature points;
determining a ratio Ro of a quantity of a feature point that is not on the plane to a quantity of all the feature points;
determining whether Ro is greater than a third preset threshold; and
if yes, determining that the landing area is the dangerous landing area.

In an embodiment of the present invention, the determining a ratio Ro of a quantity of the feature point that is not on the plane to a quantity of all the feature points includes:
calculating a distance from each feature point to the plane by using the following formula:

$$Di = \frac{(Xi \times nx + Yi \times ny + Zi \times nz - 1)}{\sqrt{nx^2 + ny^2 + nz^2}}$$

determining that a feature point having Di being greater than a fourth preset threshold is the feature point that is not on the plane; and
calculating the ratio Ro of the quantity No of the feature point that is not on the plane to the quantity N of all the feature points:

$$Ro = No/N,$$

where Xi, Yi, Zi is a world coordinate of an $i^{th}$ feature point relative to a photographing apparatus of the aircraft, i=1, ..., N, N is a quantity of the feature point in the image, and (nx, ny, nz) is a normal vector of the plane that is fit to all the feature points in the image.

In an embodiment of the present invention, the determining, according to the feature point, whether the landing area is the dangerous landing area includes:
determining a proportion Rd of a feature point whose movement distance is greater than a fifth preset threshold in two adjacent frames of images;
determining whether Rd is greater than a sixth preset threshold; and
if yes, determining that the landing area is the dangerous landing area.

In an embodiment of the present invention, the determining the proportion Rd of the feature point whose movement distance is greater than a fifth preset threshold in two adjacent frames of images includes:
determining a same feature point in the two adjacent frames of images;
determining displacement coordinate xd, yd of each same feature point in the two adjacent frames of images;
if xd or yd is greater than or equal to the fifth preset threshold, determining that the feature point is the feature point whose movement distance is greater than the fifth preset threshold; and
calculating the proportion Rd of the feature point whose movement distance is greater than the fifth preset threshold to all the same feature points in the two sequential frames of images.

In an embodiment of the present invention, the obtaining the image of the landing area includes:
obtaining the image of the landing area by using a photographing apparatus.

In an embodiment of the present invention, the photographing apparatus is a depth camera.

In an embodiment of the present invention, the determining the feature point in the image includes:
determining the feature point in the image by using a corner detection method or a blob detection method.

In an embodiment of the present invention, the corner detection method includes at least one of the following:
a features from accelerated segment test (FAST) feature point detection method and a Harris corner detection method.

In an embodiment of the present invention, the determining the feature point in the image includes:
obtaining a grayscale image of the image;
randomly choosing one pixel p from the grayscale image, and choosing m pixels on a circle with the pixel p as the center of the circle and r pixels as the radius of the circle;
calculating an absolute value of a difference between a grayscale value of the pixel p and a grayscale value of each of the m pixels;
recording a quantity of the absolute value of the difference that is greater than a seventh preset threshold; and
if the quantity of the absolute value of the difference that is greater than the seventh preset threshold is greater than an eighth preset threshold, determining that the pixel p is the feature point.

In an embodiment of the present invention, the method further including:
if the landing area is the dangerous landing area, sending a prompt alarm.

An embodiment of the present invention further provides an aircraft landing protection apparatus, including:
an obtaining module, configured to obtain an image of a landing area;
a determining module, configured to determine a feature point in the image;
a judging module, configured to determine, according to the feature point, whether the landing area is a dangerous landing area; and
a control module, configured to control the aircraft to suspend landing or control the aircraft to fly away from the dangerous landing area.

In an embodiment of the present invention, the judging module is configured to:
determine whether a quantity of the feature point in the image is less than or equal to a first preset threshold;
if yes, determine that the landing area is the dangerous landing area.

In an embodiment of the present invention, the first preset threshold is 3.

In an embodiment of the present invention, the judging module is configured to: determine a normal vector (nx, ny, nz) of a plane that is fit to all the feature points in the image;
determine whether nz in the normal vector (nx, ny, nz) is less than a second preset threshold; and
if yes, determine that the landing area is the dangerous landing area.

In an embodiment of the present invention, the judging module is configured to: determine a world coordinate of each feature point in the image relative to a photographing apparatus of the aircraft; and
calculate, by using the following formula, the normal vector (nx, ny, nz) of the plane that is fit to all the feature points in the image:

$$\begin{pmatrix} nx \\ ny \\ nz \end{pmatrix} = \begin{pmatrix} \sum Xi^2 & \sum XiYi & \sum Xi \\ \sum XiYi & \sum Yi^2 & \sum Yi \\ \sum Xi & \sum Yi & N \end{pmatrix}^{-1} * \begin{pmatrix} \sum XiZi \\ \sum YiZi \\ \sum Zi \end{pmatrix}$$

where Xi, Yi, Zi is the world coordinate of an $i$th feature point relative to the photographing apparatus of the aircraft, N, and N is the quantity of the feature point in the image.

In an embodiment of the present invention, the photographing apparatus is a depth camera capable of directly obtaining Zi, and the judging module is configured to:

obtain Zi in the world coordinate of each feature point by using the depth camera; and obtain a pixel coordinate xp, yp of each feature point, and calculate Xi, Yi by using the following formula:

$$Xi = \frac{Zi(xp - cx)}{fx}$$

$$Yi = \frac{Zi(yp - cy)}{fy}$$

where cx, cy is a coordinate of an optical center of the depth camera, and fx, fy are focal lengths of the depth camera on an X axis and a Y axis.

In an embodiment of the present invention, the photographing apparatus is a depth camera incapable of directly obtaining Zi, and the judging module is configured to:

obtain pixel coordinates xr, yr and xl, yl of a same feature point in two adjacent images; and calculate Zi, Xi and Yi by using the following formula:

$$Zi = \frac{fx \times b}{(xl - xr)}$$

$$Xi = \frac{Zi(xl - cx)}{fx}$$

$$Yi = \frac{Zi(yl - cy)}{fy}$$

where cx, cy is a coordinate of an optical center of the depth camera, fx, fy are focal lengths of the depth camera on an X axis and a Y axis, and b is a baseline distance of the depth camera.

In an embodiment of the present invention, the judging module is configured to:

determine a plane that is fit to all the feature points;

determine a ratio Ro of a quantity of a feature point that is not on the plane to a quantity of all the feature points;

determine whether Ro is greater than a third preset threshold; and if yes, determine that the landing area is the dangerous landing area.

In an embodiment of the present invention, the judging module is configured to:

calculate a distance from each feature point to the plane by using the following formula:

$$Di = \frac{(Xi \times nx + Yi \times ny + Zi \times nz - 1)}{\sqrt{nx^2 + ny^2 + nz^2}}$$

determine that a feature point having Di being greater than a fourth preset threshold is the feature point that is not on the plane; and calculate the ratio Ro of the quantity No of the feature point that is not on the plane to the quantity N of all the feature points:

$$Ro = No/N,$$

where Xi, Yi, Zi is a world coordinate of an $i^{th}$ feature point relative to a photographing apparatus of the aircraft, i=1, . . . , N, N is a quantity of the feature points in the image, and (nx, ny, nz) is a normal vector of the plane that is fit to all the feature points in the image.

In an embodiment of the present invention, the judging module is configured to:

determine a proportion Rd of a feature point whose movement distance is greater than a fifth preset threshold in two adjacent frames of images;

determine whether Rd is greater than a sixth preset threshold; and if yes, determine that the landing area is the dangerous landing area.

In an embodiment of the present invention, the judging module is configured to:

determine a same feature point in the two adjacent frames of images;

determine displacement coordinate xd, yd of each same feature point in the two adjacent frames of images;

if xd or yd is greater than or equal to the fifth preset threshold, determine that the feature point is the feature point whose movement distance is greater than the fifth preset threshold; and calculate the proportion Rd of the feature point whose movement distance is greater than the fifth preset threshold to all the same feature points in the two sequential frames of images.

In an embodiment of the present invention, the obtaining module is a photographing apparatus of the aircraft.

In an embodiment of the present invention, the photographing apparatus is a depth camera.

In an embodiment of the present invention, the determining module determines the feature point in the image by using a corner detection method or a blob detection method.

In an embodiment of the present invention, the corner detection method includes at least one of the following:

a features from accelerated segment test (FAST) feature point detection method and a Harris corner detection method.

In an embodiment of the present invention, the determining module is configured to:

obtain a grayscale image of the image;

randomly choose one pixel p from the grayscale image, and choose m pixels on a circle with the pixel p as the center of the circle and r as the radius of the circle;

calculate an absolute value of a difference between a grayscale value of the pixel p and a grayscale value of each of the m pixels;

record a quantity of the absolute value of the difference that is greater than a seventh preset threshold; and if the quantity of the absolute value of the difference that is greater than the seventh preset threshold is greater than an eighth preset threshold, determine that the pixel p is the feature point.

In an embodiment of the present invention, the apparatus further including:

a prompt alarm module, configured to: if the landing area is the dangerous landing area, send a prompt alarm.

An embodiment of the present invention further provides an aircraft, including:

a housing;

an arm connected to the housing;

a processor disposed in the housing or the arm; and a memory that is connected to and communicates with the processor, the memory being disposed inside the housing or the arm, where the memory stores instructions executable by the processor, and when the processor executing the instruction, the processor implements the foregoing aircraft landing protection method.

An embodiment of the present invention further provides a computer storage medium storing computer executable instructions, the computer executable instructions, when executed by an unmanned aerial vehicle, causing the unmanned aerial vehicle to perform the foregoing aircraft landing protection method.

The present invention is capable of determining whether a landing area is a dangerous landing area according to an obtained image, so that ensures the landing safety of an aircraft.

In an embodiment of the present invention, uneven ground, a slope, a foreign object in a descending area or a water surface can be reliably determined, thereby avoiding a crash during automatic landing.

In an embodiment of the present invention, whether a current area is suitable for landing can be determined by using a depth camera alone, so that the device is simple with low computation complexity and high reliability.

DETAILED DESCRIPTION

Embodiments of the present invention are described below in detail with reference to the accompanying drawings.

The steps illustrated in the flowcharts in the accompanying drawings can be carried out in a computer system with a group of computer executable instructions. Although the logical order of the steps is shown in the flowcharts, the illustrated or described steps may be carried out in a different order in some cases.

The embodiments of the present invention provide an aircraft landing protection method and apparatus. The method and apparatus may be used for an aircraft, so as to automatically determine whether a landing area is suitable for landing during landing of the aircraft, thereby avoiding landing to a dangerous landing area. In the embodiments of the present invention, the dangerous landing area refers to any area that is not suitable for landing of the aircraft, such as ground with a relatively steep gradient (for example, a slope), a water surface, a bush and ground having a foreign object.

The aircraft in the embodiments of the present invention may be an unmanned aircraft, a manned aircraft or the like.

Figure 1:
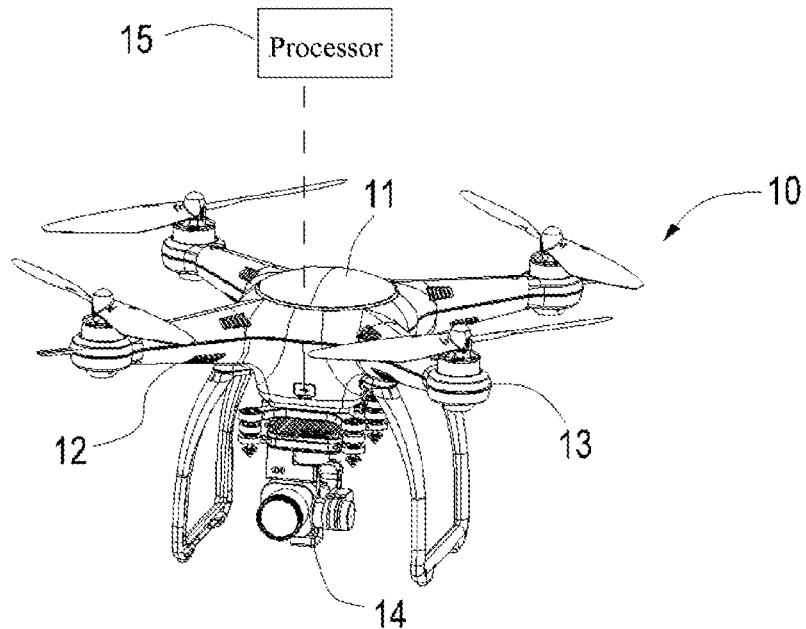
FIG. 1 is a schematic structural diagram of an aircraft according to an embodiment of the present invention.

Referring to FIG. 1, an aircraft 10 in an embodiment of the present invention includes a housing 11, an arm 12, a power apparatus 13, a photographing apparatus 14 and a processor 15.

The arm 12 is connected to the housing 11. The power apparatus 13 is disposed on the arm 12. The photographing apparatus 14 is connected to and communicates with the processor 15, and is configured to take an image of a landing area.

In an embodiment of the present invention, the photographing apparatus 14 is a depth camera. The depth camera may include, but is not limited to a binocular camera, a time of flight (TOF) camera and a structured light camera.

The aircraft 10 in this embodiment has four arms 12. That is, the aircraft 10 in this embodiment is a quadcopter. In other possible embodiments, the aircraft 10 may further be a helicopter, a tricopter, a hexacopter, an octocopter, a fixed-wing aircraft, a mixed fixed-wing and rotary-wing aircraft or the like.

The power apparatus 13 usually includes a motor disposed at an end of the arm 12 and a propeller connected to a shaft of the motor. The motor drives the propeller to rotate to provide a lifting force to the aircraft 10. The power apparatus 13 is connected to and communicates with the processor 15.

The processor 15 may include a plurality of functional units, for example, a flight control unit configured to control a flight attitude of the aircraft, a target recognition unit configured to recognize a target, a tracking unit configured to track a specific target, a navigation unit (for example, a Global Positioning System (GPS) and BeiDou) configured to navigate the aircraft and a data processing unit configured to process environmental information obtained by a related onboard device.

When the aircraft 10 is about to land, the aircraft 10 firstly obtains an image of a landing area by the photographing apparatus 14.

The landing area may be a landing position set by a user, or may be a landing point autonomously selected by the aircraft 10, for example, a position where the aircraft needs to make an emergency landing when a battery power of the aircraft is low.

In an embodiment of the present invention, when a height of the aircraft 10 from the landing area is less than or equal to a preset height, the aircraft 10 continuously obtains the image of the landing area by the photographing apparatus 14.

The preset height may be a height set by the user in advance, or may be a height set upon delivery of the aircraft 10. For example, the preset height may be 5 meters.

After the image of the landing area is obtained, the processor 15 needs to further determine a feature point in the image.

The feature point refers to a point whose image grayscale value changes sharply or a point with relatively large curvature at an edge of the image (that is, an intersection of two edges). The feature point can represent an intrinsic feature of the image, and can be used to identify a target object in the image. Image matching can be implemented through feature point matching.

Figure 2:
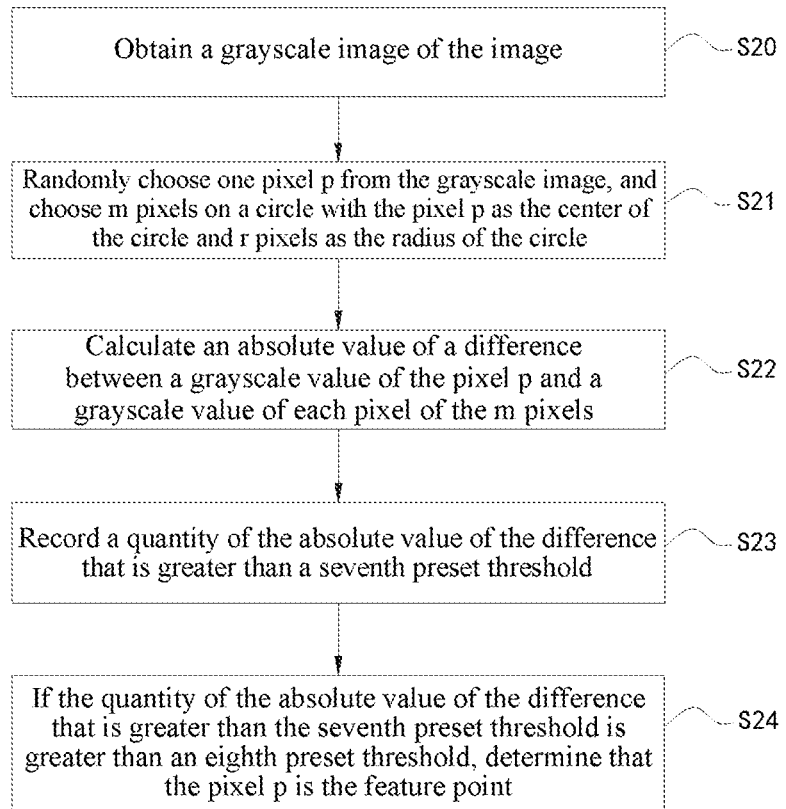
FIG. 2 is a flowchart of the aircraft shown in FIG. 1 determining a feature point in an image according to an embodiment of the present invention.

As shown in FIG. 2, in an embodiment of the present invention, the processor 15 may further determine the feature point in the image by using the following method:

S20: Obtain a grayscale image of the image.

S21: Randomly choose one pixel p from the grayscale image, and choose m pixels on a circle with the pixel p as the center of the circle and r pixels as the radius of the circle.

S22: Calculate an absolute value of a difference between a grayscale value of the pixel p and a grayscale value of each of the m pixels.

S23: Record a quantity of the absolute value of the difference that is greater than a seventh preset threshold.

S24: If the quantity of the absolute value of the difference that is greater than the seventh preset threshold is greater than an eighth preset threshold, determine that the pixel p is the feature point.

In an embodiment of the present invention, the radius r=3, m=16, and the eighth preset threshold is usually 9. The seventh preset threshold may be chosen according to experience or an actual case.

In an embodiment of the present invention, the processor 15 may further determine the feature point in the image by using a corner detection method or a blob detection method.

The corner refers to a corner of an object or an intersection between lines in the image (a point with relatively large curvature at an edge of the image), and the blob usually refers to a point whose image grayscale value changes sharply.

At present, there are multiple corner detection methods and blob detection methods. The corner detection method may include, but is not limited to a Features From Accelerated Segment Test (FAST) feature point detection method and a Harris corner detection method.

In FAST feature point detection, a detected corner is defined as a pixel that has a sufficiently large quantity of pixels in neighboring areas around the pixel, where the large quantity of pixels and the pixel are located in different areas.

The Harris corner detection method is a first-derivative matrix detection method based on image grayscale, in which detection is performed according to local self-similarity/self-correlation, that is, determining is performed according to the similarity between an image block in a local window and an image block in a window after a slight movement in each direction.

The blob detection method may include, but is not limited to: a detection method using the Laplacian of the Gaussian (LOG) operator and a method using a Hessian matrix of a pixel and the value of a determinant of the Hessian matrix.

It should be noted that at present there are many corner detection methods and blob detection methods, which are no longer described in the present invention, provided that a feature point can be detected. The present application is not limited to the several detection methods listed above.

Figure 3:
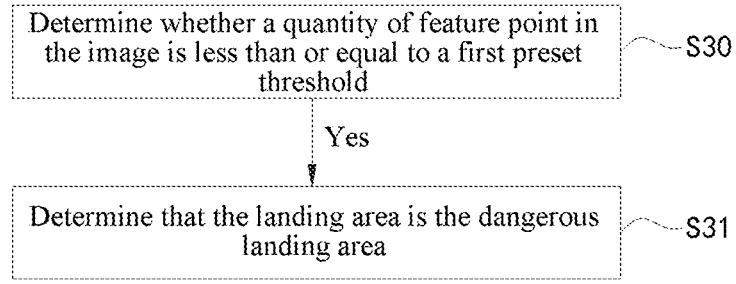
FIG. 3 is a flowchart of the aircraft shown in FIG. 1 determining whether a landing area is a dangerous landing area according to an embodiment of the present invention.

In an embodiment of the present invention, after the feature point in the image are determined, the processor 15 may determine, according to the following method, whether the landing area is the dangerous landing area, and if the landing area is the dangerous landing area, controls the aircraft 10 to suspend landing or fly away from the dangerous landing area:

As shown in FIG. 3, the processor 15 may determine, by using the following method, whether the landing area is the dangerous landing area:

S30: Determine whether a quantity of feature point in the image is less than or equal to a first preset threshold.

S31: If yes, determine that the landing area is the dangerous landing area.

Because the embodiment of the present invention needs to determine whether the landing area is the dangerous landing area according to information about multiple feature points, and therefore related determining cannot be performed when there are not enough feature points. In an embodiment of the present invention, the first preset threshold is 3. When the quantity of the feature point is less than 3, a plane cannot be fit to the feature point, and consequently a normal vector (nx, ny, nz) of the plane cannot be obtained. Therefore, when the quantity of feature point in the image is less than the first preset threshold, it is directly determined that the landing area is the dangerous landing area.

Figure 4:
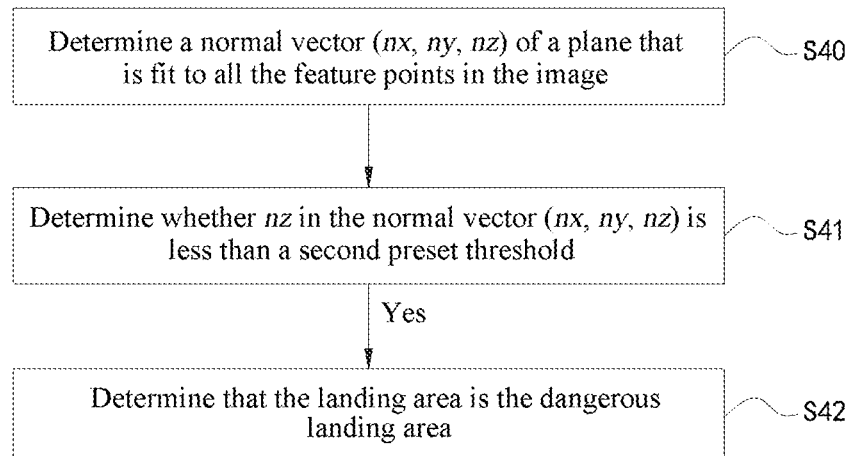
FIG. 4 is a flowchart of the aircraft shown in FIG. 1 determining whether a landing area is a dangerous landing area according to another embodiment of the present invention.

As shown in FIG. 4, in other possible embodiments, the processor 15 may further determine, by using the following manner, whether the landing area is the dangerous landing area:

S41: Determine a normal vector (nx, ny, nz) of a plane that is fit to all the feature points in the image.

In an embodiment of the present invention, the normal vector (nx, ny, nz) of the plane that is fit to all the feature points may be obtained by using the following method:

determining a world coordinate of each feature point in the image relative to the photographing apparatus 14 of the aircraft; and calculating, by using the following formula, the normal vector (nx, ny, nz) of the plane that is fit to all the feature points in the image:

$$\begin{pmatrix} nx \\ ny \\ nz \end{pmatrix} = \begin{pmatrix} \sum Xi^2 & \sum XiYi & \sum Xi \\ \sum XiYi & \sum Yi^2 & \sum Yi \\ \sum Xi & \sum Yi & N \end{pmatrix}^{-1} * \begin{pmatrix} \sum XiZi \\ \sum YiZi \\ \sum Zi \end{pmatrix}$$

where Xi, Yi, Zi is the world coordinate of an $i^{th}$ feature point relative to the photographing apparatus 14 of the aircraft, i=1, ..., N, and N is the quantity of the feature point in the image.

In another embodiment of the present invention, the normal vector (nx, ny, nz) of the plane that is fit to all the feature points in the image is determined, or may further be obtained by using a random sample consensus (RANSAC) algorithm. In the algorithm, mathematical model parameters of data are calculated according to a group of sample data sets including anomaly data, so as to obtain effective sample data.

Figure 5:
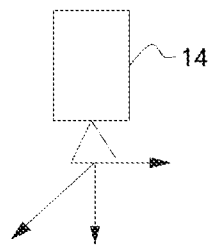
FIG. 5 is a diagram of a coordinate relationship among a feature point determined by the aircraft shown in FIG. 1, a photographing apparatus of the aircraft, and a plane that is fit to feature points.
Figure 5:
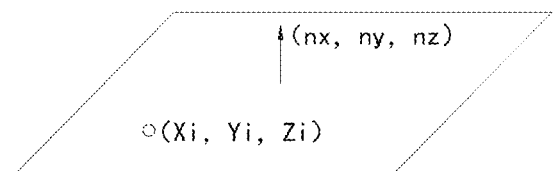

Referring to FIG. 5, FIG. 5 shows a coordinate relationship among a feature point (Xi, Yi, Zi), the photographing apparatus 14, and the plane.

In an embodiment of the present invention, the determining the world coordinate of each feature point in the image relative to the photographing apparatus 14 may include the following two cases:

(1) The photographing apparatus 14 is a depth camera capable of directly obtaining Zi:

obtaining a pixel coordinate xp, yp of each feature point, and calculating Xi, Yi by using the following formula:

$$Xi = \frac{Zi(xp - cx)}{fx}$$

$$Yi = \frac{Zi(yp - cy)}{fy}$$

where cx, cy is a coordinate of an optical center of the depth camera, and fx, fy are focal lengths of the depth camera on an X axis and a Y axis.

(2) The photographing apparatus 14 is a depth camera incapable of directly obtaining Zi, for example, a binocular camera that may indirectly obtain Zi:

obtaining pixel coordinates xr, yr and xl, yl of a same feature point in two adjacent images; and calculating Zi, Xi and Yi by using the following formula:

$$Zi = \frac{fx \times b}{(xl - xr)}$$

$$Xi = \frac{Zi(xl - cx)}{fx}$$

$$Yi = \frac{Zi(yl - cy)}{fy}$$

where cx, cy is a coordinate of an optical center of the binocular camera, fx, fy are focal lengths of the binocular camera on an X axis and a Y axis, and b is a baseline distance of the binocular camera.

S42: Determine whether nz in the normal vector (nx, ny, nz) is less than a second preset threshold.

In an embodiment of the present invention, the second preset threshold is 0.9. When nz is less than 0.9, it indicates that the landing area has an excessively steep gradient and is not suitable for landing.

S43: If yes, determine that the landing area is the dangerous landing area.

Figure 6:
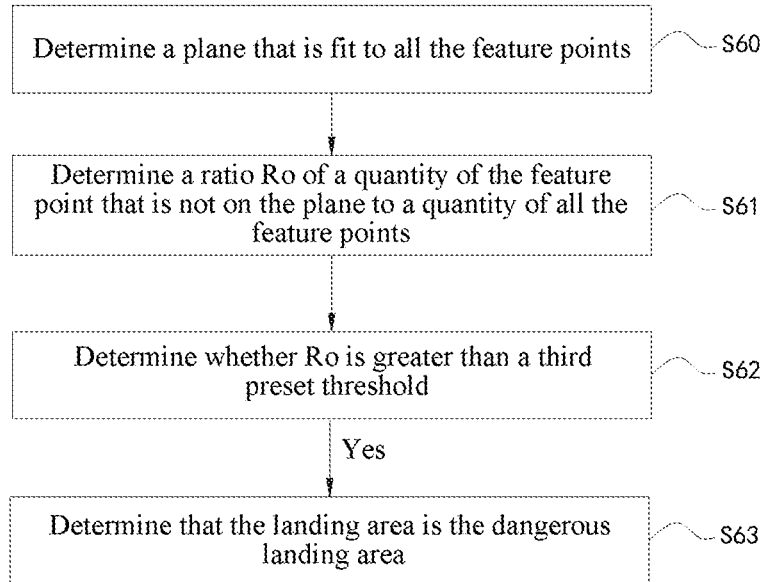
FIG. 6 is a flowchart of the aircraft shown in FIG. 1 determining whether a landing area is a dangerous landing area.

As shown in FIG. 6, in another embodiment of the present invention, the processor 15 may further determine, by using the following method, whether the landing area is the dangerous landing area:

S61: Determine a plane that is fit to all the feature points. In an embodiment of the present invention, the plane may further be a horizontal plane.

S62: Determine a ratio Ro of a quantity of the feature point that is not on the plane to a quantity of all the feature points.

In an embodiment of the present invention, a distance from each feature point to the plane is first calculated by using the following formula:

$$Di = \frac{(Xi \times nx + Yi \times ny + Zi \times nz - 1)}{\sqrt{nx^2 + ny^2 + nz^2}}$$

It is determined that a feature point having Di being greater than a fourth preset threshold is the feature point that is not on the plane. In an embodiment of the present invention, the fourth preset threshold may be 0.2 s.

The ratio Ro of the quantity No of the feature point that is not on the plane to the quantity N of all the feature points is calculated:

$$Ro = No/N,$$

where Xi, Yi, Zi is a world coordinate of an $i^{th}$ feature point relative to the photographing apparatus 14 of the aircraft, i=1, . . . , N, N is a quantity of the feature point in the image, and (nx, ny, nz) is a normal vector of the plane that is fit to all the feature points in the image.

S63: Determine whether Ro is greater than a third preset threshold.

When Ro is greater than the third preset threshold, it indicates that the landing area is uneven, may have a foreign object and is not suitable for landing. In an embodiment of the present invention, the third threshold may be set to 0.01.

S64: If yes, determine that the landing area is the dangerous landing area.

Figure 7:
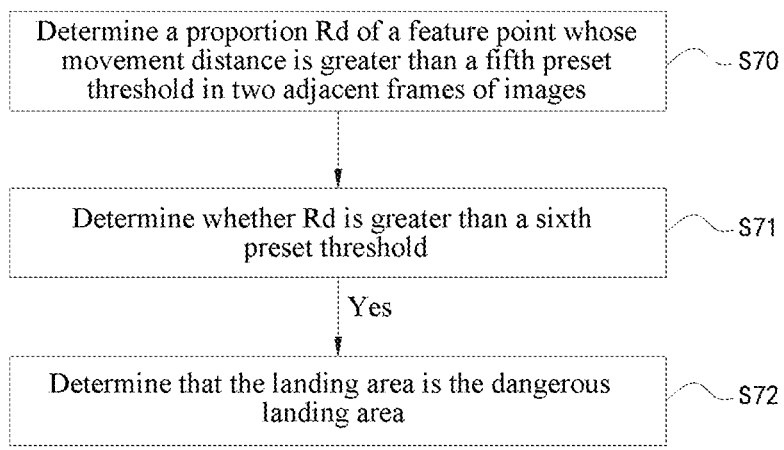
FIG. 7 is a flowchart of yet another embodiment of the aircraft shown in FIG. 1 determining whether a landing area is a dangerous landing area according to still another embodiment of the present invention.

As shown in FIG. 7, in another embodiment of the present invention, the processor 15 may further determine, by using the following method, whether the landing area is the dangerous landing area:

S70: Determine a proportion Rd of a feature point whose movement distance is greater than a fifth preset threshold in two adjacent frames of images.

Figure 8:
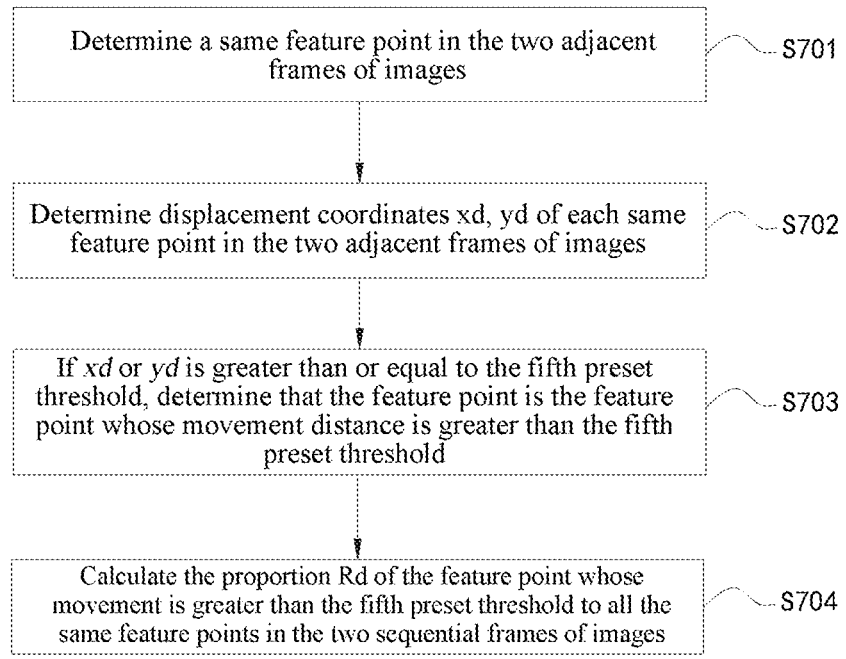
FIG. 8 is a flowchart of the aircraft shown in FIG. 1 determining a proportion Rd of a feature point whose movement distances is greater than a fifth preset threshold in two adjacent images.

As shown in FIG. 8, in an embodiment of the present invention, the processor 15 may determine, according to the following method, the proportion Rd of the feature point whose movement distance is greater than the fifth preset threshold in two adjacent frames of images:

S701: Determine a same feature point in the two adjacent frames of images.

S702: Determine displacement coordinate xd, yd of each same feature point in the two adjacent frames of images.

S703: If xd or yd is greater than or equal to the fifth preset threshold, determine that the feature point is the feature point whose movement distance is greater than the fifth preset threshold.

In another embodiment of the present invention, same feature points in two sequential frames of images may be determined by using a feature point matching manner, that is, whether two feature points are the same feature point is determined according to a degree of similarity between the two feature points. Similar to feature point detection, there are also many algorithms of feature point matching, which are no longer described in the present invention.

S704: Calculate the proportion Rd of the feature point whose movement distance is greater than the fifth preset threshold to all the same feature points in the two sequential frames of images.

In an embodiment of the present invention, the fifth preset threshold is two pixels.

S71: Determine whether Rd is greater than a sixth preset threshold.

When Rd is greater than the sixth preset threshold, it indicates that the landing area may be a water surface or another dangerous area, and is not suitable for landing of the aircraft. In an embodiment of the present invention, the sixth preset threshold is 0.1.

S72: If yes, determine that the landing area is the dangerous landing area.

In an embodiment of the present invention, after the processor 15 determines that the landing area is the dangerous landing area, the aircraft 10 may further perform at least one of the following:

sending a prompt alarm to a control terminal; and changing the landing area according to a preset rule.

The processor 15 may send a prompt alarm to the control terminal. The control terminal receives a control instruction input by a user, and changes the landing area according to the control instruction. It is then determined whether the changed landing area is the dangerous landing area.

The processor 15 may further directly change the landing area according to a preset rule. The preset rule may be to control the aircraft 10 to fly a specific distance in a preset direction, and then use the location below the current position as the landing area.

In an embodiment of the present invention, after the processor 15 determines that the landing area is the dangerous landing area, the position of the dangerous landing area may further be recorded, and a landing strategy is provided to the aircraft 10 according to the recorded position of the dangerous landing area. The position may include geographical coordinates.

In an embodiment of the present invention, the processor 15 may send the position of the dangerous landing area to the control terminal, and the control terminal displays information about the position, so as to inform the user of the geographical position and prevent the user from setting the position as the landing area again. In addition, during subsequent flight, if the landing area is said position, the processor 15 may directly determine the position as the dangerous landing area.

In this embodiment of the present invention, whether a landing area is the dangerous landing area may be determined according to the obtained image, so that the landing safety of the aircraft is ensured. Moreover, by means of this embodiment of the present invention, uneven ground, a slope, a foreign object in a descending area or a water surface can be reliably determined, thereby avoiding a crash during automatic landing in the foregoing area. In addition, in this embodiment of the present invention, whether a current area is suitable for landing can be determined by using the depth camera alone, so that the device is simple with low computation complexity and high reliability.

Figure 9:
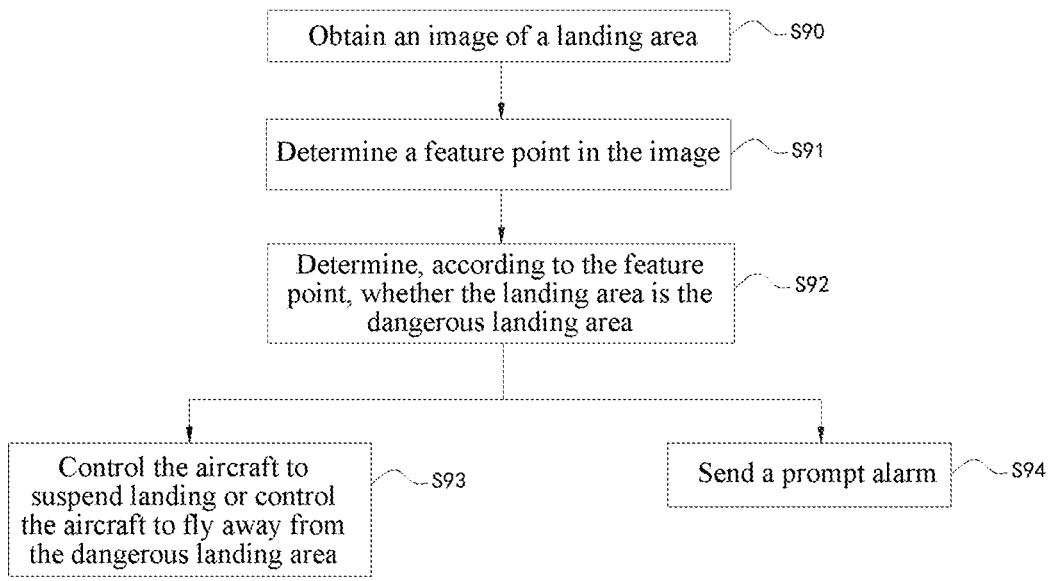
FIG. 9 is a flowchart of an aircraft landing protection method according to an embodiment of the present invention.

As shown in FIG. 9, an embodiment of the present invention further provides an aircraft landing protection method, the method including:

S90: Obtain an image of a landing area.

In an embodiment of the present invention, a photographing apparatus of the aircraft may be used to obtain the image of the landing area. The photographing apparatus may be a depth camera, for example, a binocular camera, a TOF camera and a structured light camera.

The landing area may be a landing position set by a user, or may be a landing point autonomously selected by the aircraft, for example, a position where the aircraft needs to make an emergency landing when a battery power of the aircraft is low.

In an embodiment of the present invention, when a height of the aircraft from the landing area is less than or equal to a preset height, the photographing apparatus 14 is used to continuously obtain the image of the landing area.

The preset height may be a height set by the user in advance, or may be a height set upon delivery of the aircraft. For example, the preset height may be 5 meters.

S91: Determine a feature point in the image.

As shown in FIG. 2, in an embodiment of the present invention, the aircraft may determine the feature point in the image by using the following method:

S20: Obtain a grayscale image of the image.

S21: Randomly choose one pixel p from the grayscale image, and choose m pixels from a circle with the pixel p as the center of the circle and r pixels as the radius of the circle.

S22: Calculate an absolute value of a difference between a grayscale value of the pixel p and a grayscale value of each of the m pixels.

S23. Record a quantity of the absolute value of the difference that is greater than a seventh preset threshold.

S24: If the quantity of the absolute value of the difference that is greater than the seventh preset threshold is greater than an eighth preset threshold, determine that the pixel p is the feature point.

In an embodiment of the present invention, the radius r=3, m=16, and the eighth preset threshold is usually 9. The seventh preset threshold may be chosen according to experience or an actual case.

In another embodiment of the present invention, the feature point in the image may further be determined by using a corner detection method or a blob detection method.

S92: Determine, according to the feature point, whether the landing area is the dangerous landing area.

As shown in FIG. 3, the aircraft may determine, by using the following method, whether the landing area is the dangerous landing area:

S30: Determine whether a quantity of feature point in the image is less than or equal to a first preset threshold.

S31: If yes, determine that the landing area is the dangerous landing area.

In this embodiment of the present invention, information about multiple feature points is needed to determine whether the landing area is the dangerous landing area, and therefore related determining cannot be performed when there are not enough feature points. In an embodiment of the present invention, the first preset threshold is 3. When the quantity of the feature point is less than 3, a plane cannot be fit to the feature point, and consequently a normal vector (nx, ny, nz) of the plane cannot be obtained. Therefore, when the quantity of feature point in the image is less than the first preset threshold, it is directly determined that the landing area is the dangerous landing area.

As shown in FIG. 4, in other possible embodiments, the aircraft may further determine, by using the following manner, whether the landing area is the dangerous landing area:

S41: Determine a normal vector (nx, ny, nz) of a plane that is fit to all the feature points in the image.

In an embodiment of the present invention, the normal vector (nx, ny, nz) of the plane that is fit to all the feature points may be obtained by using the following method:

determining a world coordinate of each feature point in the image relative to a photographing apparatus of the aircraft; and calculating, by using the following formula, the normal vector (nx, ny, nz) of the plane that is fit to all the feature points in the image:

$$\begin{pmatrix} nx \\ ny \\ nz \end{pmatrix} = \begin{pmatrix} \sum Xi^2 & \sum XiYi & \sum Xi \\ \sum XiYi & \sum Yi^2 & \sum Yi \\ \sum Xi & \sum Yi & N \end{pmatrix}^{-1} * \begin{pmatrix} \sum XiZi \\ \sum YiZi \\ \sum Zi \end{pmatrix}$$

where Xi, Yi, Zi is the world coordinate of an $i^{th}$ feature point relative to the photographing apparatus of the aircraft, i=1, . . . , N, and N is the quantity of the feature point in the image.

In another embodiment of the present invention, the normal vector (nx, ny, nz) of the plane that is fit to all the feature points in the image is determined, or may further be obtained by using a RANSAC algorithm. In the algorithm, mathematical model parameters of data are calculated according to a group of sample data sets including anomaly data, so as to obtain effective sample data.

Referring to FIG. 5, FIG. 5 shows a coordinate relationship among the feature point (Xi, Yi, Zi), the photographing apparatus, and the plane.

In an embodiment of the present invention, the determining the world coordinate of each feature point in the image relative to the photographing apparatus may include the following two cases:

(1) The photographing apparatus is a depth camera capable of directly obtaining the value of Zi:

obtaining pixel coordinates xp, yp of each feature point, and calculating Xi, Yi by using the following formula:

$$Xi = \frac{Zi(xp - cx)}{fx},$$

$$Yi = \frac{Zi(yp - cy)}{fy},$$

where cx, cy is coordinate of an optical center of the depth camera, and fx, fy are focal lengths of the depth camera on an X axis and a Y axis.

(2) The photographing apparatus is incapable of directly obtaining the value of Zi, and is, for example, a binocular camera that may indirectly obtain Zi:

obtaining pixel coordinates xr, yr and xl, yl of a same feature point in two adjacent images; and calculating Zi, Xi and Yi by using the following formula:

$$Zi = \frac{fx \times b}{(xl - xr)}$$

$$Xi = \frac{Zi(xl - cx)}{fx}$$

$$Yi = \frac{Zi(yl - cy)}{fy}$$

where cx, cy is a coordinate of an optical center of the binocular camera, fx, fy are focal lengths of the binocular camera on an X axis and a Y axis, and b is a baseline distance of the binocular camera.

S42: Determine whether nz in the normal vector (nx, ny, nz) is less than a second preset threshold.

In an embodiment of the present invention, the second preset threshold is 0.9. When nz is less than 0.9, it indicates that the landing area has an excessively steep gradient and is not suitable for landing.

S43: If yes, determine that the landing area is the dangerous landing area.

As shown in FIG. 6, in another embodiment of the present invention, the aircraft may further determine, by using the following method, whether the landing area is the dangerous landing area:

S61: Determine a plane that is fit to all the feature points. In an embodiment of the present invention, the plane may further be a horizontal plane.

S62: Determine a ratio Ro of a quantity of the feature point that is not on the plane to a quantity of all the feature points.

In an embodiment of the present invention, a distance from each feature point to the plane is first calculated by using the following formula:

$$Di = \frac{(Xi \times nx + Yi \times ny + Zi \times nz - 1)}{\sqrt{nx^2 + ny^2 + nz^2}}$$

It is determined that a feature point having Di being greater than a fourth preset threshold is the feature points that is not on the plane. In an embodiment of the present invention, the fourth preset threshold may be 0.2 m.

The ratio Ro of the quantity No of the feature point that is not on the plane to the quantity N of all the feature points is calculated:

$$Ro = No/N,$$

where Xi, Yi, Zi is a world coordinate of an feature point relative to the photographing apparatus of the aircraft, i=1, ..., N, N is a quantity of the feature point in the image, and (nx, ny, nz) is a normal vector of the plane that is fit to all the feature points in the image.

S63: Determine whether Ro is greater than a third preset threshold.

When Ro is greater than the third preset threshold, it indicates that the landing area is uneven, may have a foreign object, and is not suitable for landing. In an embodiment of the present invention, the third threshold may be set to 0.01.

S64: If yes, determine that the landing area is a dangerous landing area.

As shown in FIG. 7, in another embodiment of the present invention, the aircraft may further determine, by using the following method, whether the landing area is the dangerous landing area:

S70: Determine a proportion Rd of a feature point whose movement distance is greater than a fifth preset threshold in two adjacent frames of images.

As shown in FIG. 8, in an embodiment of the present invention, the aircraft may determine, according to the following method, the proportion Rd of the feature point whose movement distance is greater than the fifth preset threshold in two adjacent frames of images:

S701: Determine a same feature point in the two adjacent frames of images.

S702: Determine displacement coordinate xd, yd of each same feature point in the two adjacent frames of images.

S703: If xd or yd is greater than or equal to the fifth preset threshold, determine that the feature point is the feature point whose movement distance is greater than the fifth preset threshold.

In another embodiment of the present invention, the same feature point in two sequential frames of images may be determined by using a feature point matching manner, that is, whether two feature points are the same feature point is determined according to a degree of similarity between the two feature points. Similar to feature point detection, there are also many algorithms of feature point matching, which are no longer described in the present invention.

S704: Calculate the proportion Rd of the feature point whose movement distance is greater than the fifth preset threshold to all the same feature points in the two sequential frames of images.

In an embodiment of the present invention, the fifth preset threshold is two pixels.

S71: Determine whether Rd is greater than a sixth preset threshold.

When Rd is greater than the sixth preset threshold, it indicates that the landing area may be a water surface or another dangerous area, and is not suitable for landing of the aircraft. In an embodiment of the present invention, the sixth preset threshold is 0.1.

S72: If yes, determine that the landing area is the dangerous landing area.

S93: If yes, the aircraft suspends landing or the aircraft flies away from the dangerous landing area.

In an embodiment of the present invention, after it is determined that the landing area is the dangerous landing area, the aircraft may further perform at least one of the following:

sending a prompt alarm to a control terminal; and
changing the landing area according to a preset rule.

The aircraft may send the prompt alarm to the control terminal. The control terminal receives a control instruction input by a user, and changes the landing area according to the control instruction. It is then determined whether the changed landing area is the dangerous landing area.

The aircraft may further directly change the landing area according to a preset rule. The preset rule may be to control the aircraft to fly a specific distance in a preset direction, and then use the location below the current position as a landing area.

In an embodiment of the present invention, after it is determined that the landing area is the dangerous landing area, the position of the dangerous landing area may further be recorded, and the aircraft autonomously selects a landing strategy according to the recorded position of the dangerous landing area. The position may include geographical coordinates.

In an embodiment of the present invention, the position of the dangerous landing area may be sent to the control terminal, and the control terminal displays information about the position, so as to inform the user of the geographical position and prevent the user from setting the position as the landing area again. In addition, during subsequent flight, if the landing area is the position, the position may be directly determined as the dangerous landing area.

Reference may be made to the foregoing description for the detailed content relating to the steps in the method, and details are no longer described here.

An embodiment of the present invention further provides an aircraft landing protection apparatus. The apparatus is configured to implement the foregoing embodiments and implementations, and the described content is no longer described. For example, the term "module" used in the following may be a combination of software and/or hardware that implements a predetermined function. Although the apparatus described in the following embodiment may be implemented by using software, the implementation of hardware or a combination of software and hardware is also possible and conceivable.

Figure 10:
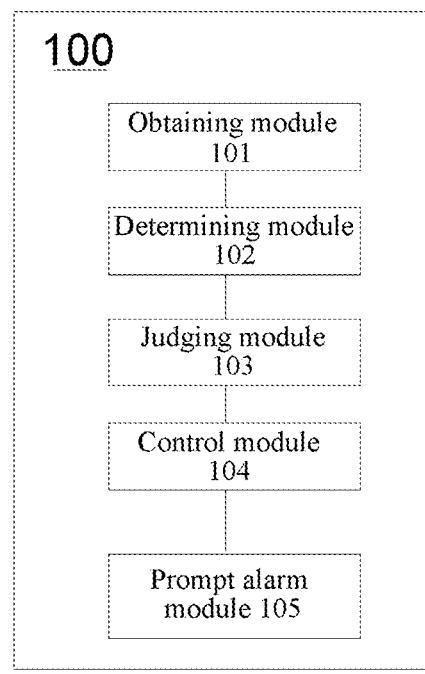
FIG. 10 is a structural block diagram of an aircraft landing protection apparatus according to an embodiment of the present invention.

As shown in FIG. 10, an embodiment of the present invention further provides an aircraft landing protection apparatus 100. The apparatus includes:

an obtaining module 101, configured to obtain an image of a landing area;

a determining module 102, configured to determine a feature point in the image;

a judging module 103, configured to determine, according to the feature point, whether the landing area is a dangerous landing area; and a control module 104, configured to control the aircraft to suspend landing or control the aircraft to fly away from the dangerous landing area.

In an embodiment of the present invention, the judging module 103 is configured to:

determine whether a quantity of the feature point in the image is less than or equal to a first preset threshold; and if yes, determine that the landing area is the dangerous landing area.

In an embodiment of the present invention, the first preset threshold is 3.

In an embodiment of the present invention, the judging module 103 is configured to:

determine a normal vector (nx, ny, nz) of a plane that is fit to all the feature points in the image;

determine whether nz in the normal vector (nx, ny, nz) is less than a second preset threshold; and if yes, determine that the landing area is the dangerous landing area.

In an embodiment of the present invention, the judging module 103 is configured to:

determine a world coordinate of each feature point in the image relative to a photographing apparatus of the aircraft; and calculate, by using the following formula, the normal vector (nx, ny, nz) of the plane that is fit to all the feature points in the image:

$$\begin{pmatrix} nx \\ ny \\ nz \end{pmatrix} = \begin{pmatrix} \sum Xi^2 & \sum XiYi & \sum Xi \\ \sum XiYi & \sum Yi^2 & \sum Yi \\ \sum Xi & \sum Yi & N \end{pmatrix}^{-1} * \begin{pmatrix} \sum XiZi \\ \sum YiZi \\ \sum Zi \end{pmatrix},$$

where Xi, Yi, Zi is the world coordinate of an $i^{th}$ feature point relative to the photographing apparatus of the aircraft, i=1, ..., N, and N is the quantity of the feature point in the image.

In an embodiment of the present invention, the photographing apparatus is a depth camera, and the judging module 103 is configured to:

obtain Zi in the world coordinate of each feature point by using the depth camera; and obtain a pixel coordinate xp, yp of each feature point, and calculate Xi, Yi by using the following formula:

$$Xi = \frac{Zi(xp - cx)}{fx}$$

$$Yi = \frac{Zi(yp - cy)}{fy}$$

where cx, cy is a coordinate of an optical center of the depth camera, and fx, fy are focal lengths of the depth camera on an X axis and a Y axis.

In an embodiment of the present invention, the photographing apparatus is a binocular camera, and the judging module 103 is configured to:

obtain pixel coordinates xr, yr and xl, yl of a same feature point in two adjacent images; and calculate Zi, Xi and Yi by using the following formula:

$$Zi = \frac{fx \times b}{(xl - xr)}$$

$$Xi = \frac{Zi(xl - cx)}{fx}$$

$$Yi = \frac{Zi(yl - cy)}{fy}$$

where cx, cy is a coordinate of the optical center of the binocular camera, fx, fy are focal lengths of a stereo camera on an X axis and a Y axis, and h is a baseline distance of the binocular camera.

In an embodiment of the present invention, the judging module 103 is configured to:

determine a plane that is fit to all the feature points;

determine a ratio Ro of a quantity of a feature point that is not on the plane to a quantity of all the feature points;

determine whether Ro is greater than a third preset threshold; and if yes, determine that the landing area is the dangerous landing area.

In an embodiment of the present invention, the judging module 103 is configured to:

calculate a distance from each feature point to the plane by using the following formula:

$$Di = \frac{(Xi \times nx + Yi \times ny + Zi \times nz - 1)}{\sqrt{nx^2 + ny^2 + nz^2}}$$

determine that a feature point having Di being greater than a fourth preset threshold is the feature point that is not on the plane; and calculate the ratio Ro of the quantity No of the feature point that is not on the plane to the quantity N of all the feature points:

$$Ro = No/N,$$

where Xi, Yi, Zi are a world coordinate of an $i^{th}$ feature point relative to a photographing apparatus of the aircraft, i=1, ..., N, N is a quantity of the feature point in the image, and (nx, ny, nz) is a normal vector of the plane that is fit to all the feature points in the image.

In an embodiment of the present invention, the judging module 103 is configured to:

determine a proportion Rd of a feature point whose movement distance is greater than a fifth preset threshold in two adjacent frames of images;

determine whether Rd is greater than a sixth preset threshold; and if yes, determine that the landing area is the dangerous landing area.

In an embodiment of the present invention, the judging module 103 is configured to:

determine a same feature points in the two adjacent frames of images;

determine displacement coordinate xd, yd of each same feature point in the two adjacent frames of images;

if xd or yd is greater than or equal to the fifth preset threshold, determine that the feature point is the feature point whose movement distance is greater than the fifth preset threshold; and calculate the proportion Rd of the feature point whose movement distance is greater than the fifth preset threshold to all the same feature points in the two sequential frames of images.

In an embodiment of the present invention, the obtaining module 101 is a photographing apparatus of the aircraft.

In an embodiment of the present invention, the photographing apparatus is a depth camera.

In an embodiment of the present invention, the determining module 102 determines the feature point in the image by using a corner detection method or a blob detection method.

In an embodiment of the present invention, the corner detection method includes at least one of the following:

a FAST feature point detection method and a Harris corner detection method.

In an embodiment of the present invention, the determining module 102 is configured to:

obtain a grayscale image of the image;

randomly choose one pixel p from the grayscale image, and choose m pixels on a circle with the pixel p as the center of the circle and r as the radius of the circle;

calculate an absolute value of a difference between a grayscale value of the pixel p and a grayscale value of each of the m pixels;

record a quantity of the absolute value of the difference that is greater than a seventh preset threshold; and if the quantity of the absolute value of the difference that is greater than the seventh preset threshold is greater than an eighth preset threshold, determine that the pixel p is the feature point.

In an embodiment of the present invention, the apparatus further includes:

a prompt alarm module 105, configured to: if the landing area is the dangerous landing area, send a prompt alarm.

Reference may be made to the foregoing description for the detailed content relating to the modules in the apparatus, and details are no longer described here.

An embodiment of the present invention further provides an aircraft, including a processor and a computer readable storage medium. The computer readable storage medium stores instructions. When the processor executing the instruction, the processor implements any of the foregoing aircraft landing protection methods.

An embodiment of the present invention further provides a computer readable storage medium. The computer readable storage medium stores a computer program. When executing the computer program, the processor implements any of the foregoing aircraft landing protection methods.

The computer readable storage medium may include, but is not limited to: any medium that can store program code, such as a USB flash drive, a read-only memory (ROM), a random-access memory (RAM), a removable hard disk, a magnetic disk or an optical disc.

Apparently, persons skilled in the art should understand that the foregoing modules or steps in the embodiments of the present invention may be implemented by using a common computing apparatus. The modules or steps may be arranged in a single computing apparatus or distributed in a network formed of multiple computing apparatuses. Optionally, the modules or steps may be implemented by using program code executable by a computing apparatus, so that the modules or steps may be stored in a storage apparatus and executed by the computing apparatus, and in some cases, the shown or described steps may be performed in orders different from those here, the steps are separately manufactured into integrated circuit modules for implementation, or some of the modules or steps are manufactured into a single integrated circuit module for implementation. In this way, the embodiments of the present invention are not limited to any specific combination of hardware and software.

Although the implementations of the present application are disclosed above, the content is only used for ease of understanding of implementations used in the present application, but is not used to limit the present application. Any person skilled in the field of the present application may make any modification or variation to implementation forms and details without departing from the spirit and scope of the present application, but the protection scope of the patent of the present application should still be as defined by the appended claims.

What is claimed is:

1. An aircraft landing protection method, comprising:
obtaining an image of a landing area;
determining a feature point in the image;
determining, according to the feature point, whether the landing area is a dangerous landing area; and
controlling the aircraft to suspend landing or controlling the aircraft to fly away from the dangerous landing area;
wherein the feature point refers to a point whose image grayscale value changes sharply or a point with relatively large curvature at an edge of the image; the feature point represents an intrinsic feature of the image, and is used to identify a target object in the image; the dangerous landing area refers to any area that is not suitable for landing of the aircraft,
wherein the determining, according to the feature point, whether the landing area is the dangerous landing area comprises:
determining whether a quantity of the feature points in the image is less than or equal to a first preset threshold of the quantity of the feature points.

2. The method according to claim 1, wherein the first preset threshold is 3.

3. An aircraft landing protection method, comprising:
obtaining an image of a landing area;
determining a feature point in the image;
determining, according to the feature point, whether the landing area is a dangerous landing area; and
controlling the aircraft to suspend landing or controlling the aircraft to fly away from the dangerous landing area,
wherein the determining, according to the feature point, whether the landing area is the dangerous landing area comprises:
determining a normal vector (nx, ny, nz) of a plane that is fit to all the feature points in the image;
determining whether nz in the normal vector (nx, ny, nz) is less than a second preset threshold of the nz in the normal vector, and
wherein the determining the normal vector (nx, ny, nz) of the plane that is fit to all the feature points in the image comprises:
determining a world coordinate of each feature point in the image relative to a photographing apparatus of the aircraft; and
calculating, by using the following formula, the normal vector (nx, ny, nz) of the plane that is fit to all the feature points in the image:

$$\begin{pmatrix} nx \\ ny \\ nz \end{pmatrix} = \begin{pmatrix} \sum Xi^2 & \sum XiYi & \sum Xi \\ \sum XiYi & \sum Yi^2 & \sum Yi \\ \sum Xi & \sum Yi & N \end{pmatrix}^{-1} * \begin{pmatrix} \sum XiZi \\ \sum YiZi \\ \sum Zi \end{pmatrix}$$

wherein Xi, Yi, Zi is the world coordinate of an i.sup.th feature point relative to the photographing apparatus of the aircraft, i=1, ..., N, and N is the quantity of the feature point in the image.

4. The method according to claim 3, wherein the photographing apparatus is a depth camera capable of directly obtaining Zi, and the determining the world coordinate of each feature point in the image relative to the photographing apparatus of the aircraft comprises:
obtaining Zi in the world coordinate of each feature point by using the depth camera; and
obtaining a pixel coordinate xp, yp of each feature point, and calculating Xi, Yi by using the following formula:

$$Xi = \frac{Zi(xp - cx)}{fx}$$

$$Yi = \frac{Zi(yp - cy)}{fy}$$

wherein cx, cy is a coordinate of an optical center of the depth camera, and fx, fy are focal lengths of the depth camera on an X axis and a Y axis.

5. The method according to claim 3, wherein the photographing apparatus is a depth camera incapable of directly obtaining Zi, and the determining the world coordinate of each feature point in the image relative to the photographing apparatus of the aircraft comprises:
obtaining pixel coordinates xr, yr and xl, yl of a same feature point in two adjacent images; and
calculating Zi, Xi and Yi by using the following formula:

$$Zi = \frac{fx \times b}{(xl - xr)}$$

$$Xi = \frac{Zi(xl - cx)}{fx}$$

$$Yi = \frac{Zi(yl - cy)}{fy}$$

wherein cx, cy is a coordinate of an optical center of the depth camera, fx, fy are focal lengths of the depth camera on an X axis and a Y axis, and b is a baseline distance of the depth camera.

6. An aircraft landing protection method, comprising:
obtaining an image of a landing area;
determining a feature point in the image;
determining, according to the feature point, whether the landing area is a dangerous landing area; and
controlling the aircraft to suspend landing or controlling the aircraft to fly away from the dangerous landing area,
wherein the determining, according to the feature point, whether the landing area is the dangerous landing area comprises:
determining a plane that is fit to all the feature points;
determining a ratio Ro of a quantity of a feature point that is not on the plane to a quantity of all the feature points;
determining whether Ro is greater than a third preset threshold of the quantity of a feature point that is not on the plane to a quantity of all the feature points,
wherein the determining a ratio Ro of a quantity of the feature point that is not on the plane to a quantity of all the feature points comprises:
calculating a distance from each feature point to the plane by using the following formula:

$$Di = \frac{(Xi \times nx + Yi \times ny + Zi \times nz - 1)}{\sqrt{nx^2 + ny^2 + nz^2}}$$

determining that a feature point having Di being greater than a fourth preset threshold is the feature point that is not on the plane; and calculating the ratio Ro of the quantity No of the feature point that is not on the plane to the quantity N of all the feature points:

$Ro=No/N$, wherein Xi, Yi, Zi is a world coordinate of an i.sup.th feature point relative to a photographing apparatus of the aircraft, i=1, . . . , N, N is a quantity of the feature point in the image, and (nx, ny, nz) is a normal vector of the plane that is fit to all the feature points in the image.

7. An aircraft landing protection method, comprising:
obtaining an image of a landing area;
determining a feature point in the image;
determining, according to the feature point, whether the landing area is a dangerous landing area; and
controlling the aircraft to suspend landing or controlling the aircraft to fly away from the dangerous landing area;
wherein the feature point refers to a point whose image grayscale value changes sharply or a point with relatively large curvature at an edge of the image; the feature point represents an intrinsic feature of the image, and is used to identify a target object in the image; the dangerous landing area refers to any area that is not suitable for landing of the aircraft,
wherein the determining, according to the feature point, whether the landing area is the dangerous landing area comprises:
determining a proportion Rd of a feature point whose movement distance is greater than a fifth preset threshold of the movement distance in two adjacent frames of images;
determining whether Rd is greater than a sixth preset threshold of the movement distance.

8. The method according to claim 7, wherein the determining the proportion Rd of the feature point whose movement distance is greater than a fifth preset threshold of the movement distance in two adjacent frames of images comprises:
determining a same feature point in the two adjacent frames of images;
determining displacement coordinate xd, yd of each same feature point in the two adjacent frames of images;
if xd or yd is greater than or equal to the fifth preset threshold of the movement distance, determining that the feature point is the feature point whose movement distance is greater than the fifth preset threshold of the movement distance; and
calculating the proportion Rd of the feature point whose movement distance is greater than the fifth preset threshold of the movement distance to all the same feature points in the two sequential frames of images.

9. An aircraft landing protection method, comprising:
obtaining an image of a landing area;
determining a feature point in the image;
determining, according to the feature point, whether the landing area is a dangerous landing area; and
controlling the aircraft to suspend landing or controlling the aircraft to fly away from the dangerous landing area;
wherein the feature point refers to a point whose image grayscale value changes sharply or a point with relatively large curvature at an edge of the image; the feature point represents an intrinsic feature of the image, and is used to identify a target object in the image; the dangerous landing area refers to any area that is not suitable for landing of the aircraft,
wherein the obtaining the image of the landing area comprises:
obtaining the image of the landing area by using a photographing apparatus.

10. The method according to claim 9, wherein the photographing apparatus is a depth camera.

11. An aircraft landing protection method, comprising:
obtaining an image of a landing area;
determining a feature point in the image;
determining, according to the feature point, whether the landing area is a dangerous landing area; and
controlling the aircraft to suspend landing or controlling the aircraft to fly away from the dangerous landing area;
wherein the feature point refers to a point whose image grayscale value changes sharply or a point with relatively large curvature at an edge of the image; the feature point represents an intrinsic feature of the image, and is used to identify a target object in the image; the dangerous landing area refers to any area that is not suitable for landing of the aircraft,
wherein the determining the feature point in the image comprises: determining the feature point in the image by using a corner detection method or a blob detection method.

12. The method according to claim 11, wherein the corner detection method comprises at least one of the following:
a features from accelerated segment test (FAST) feature point detection method and a Harris corner detection method.

13. An aircraft landing protection method, comprising:
obtaining an image of a landing area;
determining a feature point in the image;
determining, according to the feature point, whether the landing area is a dangerous landing area; and
controlling the aircraft to suspend landing or controlling the aircraft to fly away from the dangerous landing area;
wherein the feature point refers to a point whose image grayscale value changes sharply or a point with relatively large curvature at an edge of the image; the feature point represents an intrinsic feature of the image, and is used to identify a target object in the image; the dangerous landing area refers to any area that is not suitable for landing of the aircraft,
wherein the determining the feature point in the image comprises:
obtaining a grayscale image of the image;
randomly choosing one pixel p from the grayscale image, and choosing m pixels on a circle with the pixel p as the center of the circle and r pixels as the radius of the circle;
calculating an absolute value of a difference between a grayscale value of the pixel p and a grayscale value of each of the in pixels;
recording a quantity of the absolute value of the difference that is greater than a seventh preset threshold of the quantity of the absolute value of the difference between a grayscale value of the pixel p and a grayscale value of each of the in pixels; and
if the quantity of the absolute value of the difference that is greater than the seventh preset threshold of the quantity of the absolute value of the difference between a grayscale value of the pixel p and a grayscale value of each of the in pixels is greater than an eighth preset threshold of the quantity of the absolute value of the difference between a grayscale value of the pixel p and a grayscale value of each of the in pixels, determining that the pixel p is the feature point.

* * * * *